April 26, 1966 L. J. SIEGHARTNER 3,247,797
SEALING MEANS FOR ROTARY PUMP SHAFTS AND THE LIKE
Original Filed April 5, 1962 2 Sheets-Sheet 2

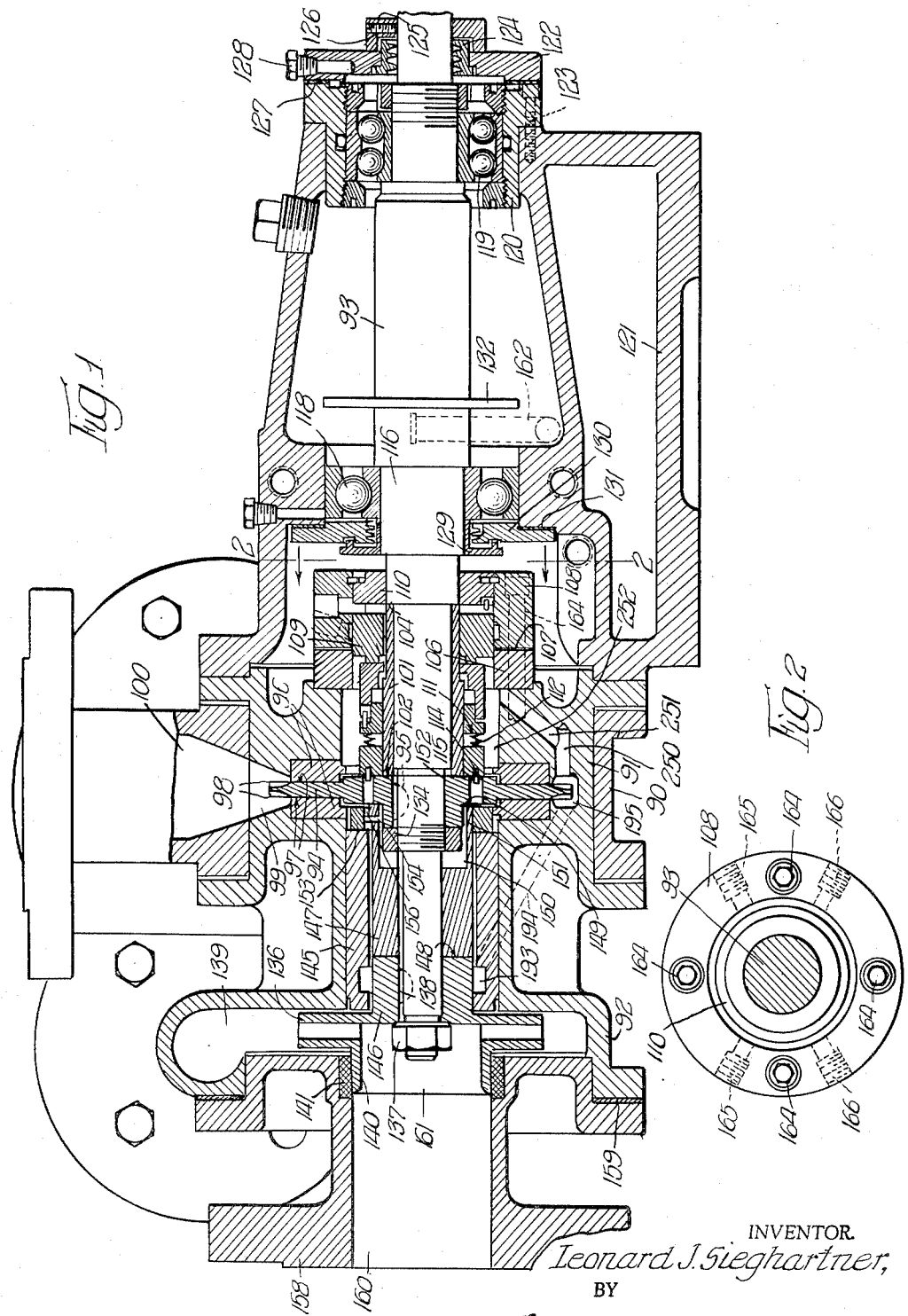

INVENTOR.
Leonard J. Sieghartner,
BY
ATTYS.

United States Patent Office 3,247,797
Patented Apr. 26, 1966

3,247,797
SEALING MEANS FOR ROTARY PUMP SHAFTS
AND THE LIKE
Leonard J. Sieghartner, Coal Valley, Ill., assignor to Roy
E. Roth Company, Rock Island, Ill., a corporation of
Illinois
Original application Apr. 5, 1962, Ser. No. 185,391, now
Patent No. 3,154,020, dated Oct. 27, 1964. Divided
and this application July 31, 1964, Ser. No. 386,711
10 Claims. (Cl. 103—105)

The present application is a division of my application Serial No. 185,391 filed April 5, 1962, now issued as Patent No. 3,154,020, under date of October 27, 1964.

This invention relates to sealing means for rotary pump shafts, and the like.

One of the features of the present invention resides in the provision of a centrifugal turbine pump comprising a casing having a pair of internal pumping chambers, a pump shaft mounted for rotation within said casing, a turbine impeller and rotatable part fixed for rotation with said shaft, said turbine impeller being operable within one pumping chamber, a centrifugal impeller fixed on the end of the shaft for rotation with the shaft and operable within the other pumping chamber, the turbine impeller having vanes at its outer periphery operable within one of said pumping chambers, liners disposed within said casing and cooperating with opposite sides of said turbine impeller inwardly of said vanes to form sealing surfaces therewith, a stationary annular seal bushing surrounding the shaft and disposed between the centrifugal and turbine impellers, a ring closely fitting the rotatable part of the pump and fixed for rotation with said shaft including a pin rotatable with the shaft, the ring having a longitudinal groove engaging the pin for axial movement, the close fitting ring being disposed between the impeller and the annular seal bushing and movable longitudinally with respect to the shaft, and the close fitting ring at the end toward the impeller being exposed to pressure from the impeller reaching the end of the ring along the sealing surface between the impeller and the liner whereby such pressure forces the close fitting ring longitudinally against the annular seal bushing to seal off pressure from the channel in which the vanes of the impeller operate.

Another feature resides in providing the annular seal bushing with an annular groove in its inner surface from which a passage extends to a channel at the turbine stage of the pump.

Another feature resides in providing a stationary annular seal bushing which surrounds a hub on the centrifugal impeller, and an impeller spacer within the annular seal bushing and surrounding the shaft, the impeller spacer abutting at one end the inner end of the hub of the centrifugal impeller and abutting the turbine impeller at its opposite end.

Another feature resides in providing the centrifugal impeller with a suction inlet for the entry of liquid which passes from the centrifugal impeller to the turbine impeller.

Another feature resides in providing an impeller spacer which is recessed at the end adjacent the turbine impeller to form an annular wall which surrounds a nut which cooperates with the turbine impeller and holds the turbine impeller between the nut and a sleeve surrounding the shaft.

Another feature resides in providing a structure wherein the pin rotatable with the shaft is carried by the impeller spacer.

Another feature resides in the provision of a two stage turbine pump comprising a casing, a shaft mounted for rotation in the casing, a pair of turbine impellers fixed for rotation with the shaft and operable within the casing, the impellers having vanes at their outer peripheries operable within channels, liners disposed within the casing and cooperating with opposite sides of each of the impellers inwardly of the vanes to form sealing surfaces therewith, a first stationary annular seal bushing surrounding the shaft and spaced from one of the impellers, a second stationary annular seal bushing surrounding the shaft and spaced from the other impeller, a first ring closely fitting a rotatable part of the pump and fixed for rotation with the shaft, a second ring closely fitting a rotatable part of the pump and also fixed for rotation with the shaft, the rings having longitudinal grooves engaging pins for axial movement, the close fitting rings being disposed between the impellers and the annular seal bushings and movable longitudinally with respect to the shaft, and the close fitting rings at the ends toward the impellers being exposed to pressure from the impellers reaching the ends of the close fitting rings along the sealing surfaces between the impellers and the liners whereby this pressure forces the close fitting rings longitudinally against the annular seal bushings to seal off pressure from the channels in which the vanes of the impellers operate.

Another feature resides in the provision of a liner bushing surrounding the shaft between the impellers.

Another feature resides in the provision of a pump casing which is positioned between bearing brackets having tubular portions within which the first and second stationary annular seal bushings are positioned.

Another feature resides in the provision of bleed backs from positions outwardly of the bushings to lower pressure areas.

Further features and numerous advantages and adaptations of the invention will be apparent from the following detailed description taken in connection with the accompanying drawings, it being understood that the invention is limited only within the scope of the appended claims and not to the particular embodiments selected for illustration.

In the drawings:

FIGURE 1 is a longitudinal sectional view illustrating the application of sealing means embodying the present invention to a centrifugal-turbine pump;

FIGURE 2 is a view partially in section and partially in elevation taken along the line 2—2 of FIGURE 1.

Figure 3:
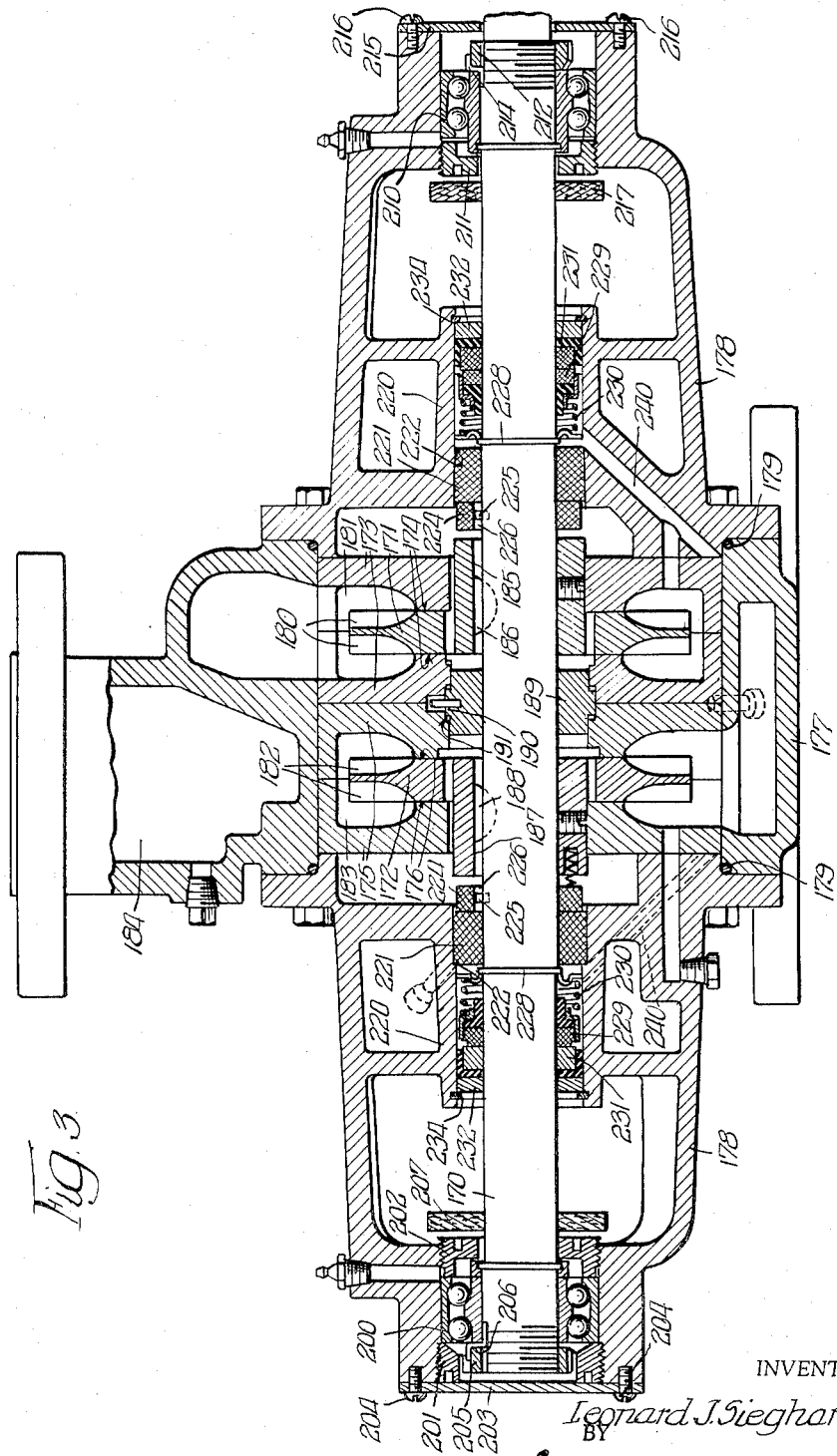
FIGURE 3 is a longitudinal sectional view illustrating another application of sealing means embodying the present invention to a two stage turbine pump.

The pump shown in FIGURES 1 and 2 is a centrifugal-turbine pump having a casing 90, an inboard head 91, a case head 92 and a shaft 93.

A turbine impeller 94 is fixed, for example, by a Woodruff key 95 or spline to rotate with the shaft 93. The impeller 94 rotates between wear rings 96 which cooperate with the opposite sides of the impeller 94 to form sealing surfaces 97. The impeller 94 has vanes or blades 98 opening from the opposite sides and peripherally from the impeller and operable in the channel 99 and the liquid is discharged through the pump outlet 100.

A shaft sleeve 101 surrounds the shaft 93 and at 102 abuts the inboard end of the impeller 94. The opposite end of the sleeve 101 abuts a shoulder 104 on the shaft 93. A stuffing box 106 is positioned with a gasket 107 between same and a gland 108. A carbon stationary seat is provided at 109 and a quench bushing is provided at 110. A seal rotating unit is provided at 111. This unit has a spring 112 and pins 114 engaging in openings 115 in the impeller 94.

A further enlarged diameter portion 116 of the shaft 93 is journaled for rotation in an inboard bearing 118. An outboard bearing 119 is provided between the shaft 93 and a bearing cartridge 120 in the adjacent end of the frame 121. An outer housing cap 122 is secured to the frame 121 by screws 123. A cap seal 124 is provided about the shaft 93 within the cap 122 and an outboard slinger 125 is secured to the shaft 93 by set screws 126. A gasket 127 is provided between the cap 122 and the bearing cartridge 120. A vent fitting is provided at 128.

A water slinger is provided at 129 and an inner housing cap is provided at 130. A gasket 131 is provided between the cap 130 and the adjacent portion of the frame 121. The shaft 93 carries an oil slinger 132 positioned within the frame 121 and between the bearings 118 and 119.

An impeller lock nut 134 is screwed upon the reduced diameter portion of the shaft 93. The nut 134 holds the hub of the impeller 94 between the nut 134 and the adjacent end of the sleeve 101. The centrifugal impeller 136 is secured on the centrifugal stage end of the shaft 93 by a nut 137 and is fixed, for example, by a Woodruff key 138 or spline to rotate with the shaft 93. The centrifugal impeller 136 rotates within the channel 139 and the hub 140 of the impeller 136 rotates in the bushing 141.

An annular carbon stationary bushing 145 is disposed within the case and surrounds the hub 146 of the impeller 136 and an impeller spacer 147. The impeller spacer 147 abuts at one end at 148 the inner end of the hub 146 and at its opposite end at 149 the impeller 94. The inner end of the spacer 147 is recessed at 150 to form an annular wall 151 which surrounds nut 134 and the hub 152 of the turbine impeller 94.

An annular throttle ring 153 fits closely about the spacer 151 in position between the impeller 94 and the adjacent end of the bushing 145. The spacer 147 rotates with the shaft 93 and the annular wall 151 carries a generally radial pin 154 which at its outer end engages in longitudinal groove 156 in the inner periphery of the throttle or sealing ring 153. The ring 153 thus rotates with the shaft 93.

A head 158 is attached to the case head 92 with a gasket 159 therebetween. The head 158 has an inlet 160 which opens into the suction inlet 161 of the centrifugal impeller 136. An oil gauge may be provided at 162.

In the operation of the pump shown in FIGURES 2 and 3, the liquid enters the suction entrance 161 of the centrifugal impeller 136 and the liquid passes from the centrifugal stage to the turbine stage constituted by the turbine impeller 94 and is discharged through the outlet 100. In operation, the pressure or pressure leakage from the turbine stage along the sealing surface 97 acts on the adjacent end of the rotating ring 153 and forces this ring longitudinally against the adjacent end of the stationary bushing 145. The high pressure from the turbine stage is thus effectively sealed off from the centrifugal stage of the pump constituted by the impeller 136.

As before, the close fitting ring 153 which rotates with the shaft 93 together with the stationary seal bushing 145 forms a close restriction to flow along the shaft 93 without the use of gasketing material. The clearance between the member 147 and the ring 153 may be much less than is practical with a stationary bushing alone. Also, as before, the interface between the rotating ring 153 and the carbon stationary bushing 145 allows for radial deflection or displacement of the shaft without contact with the bushing 145.

The gland 108 is secured to the inboard head 91 with the stuffing box 106 therebetween, for example, by bolts 164. As shown in FIGURE 2, coolant or lubricating connections may be provided at 165 and quench connections may be provided at 166.

The inner surface of the bushing 145 has an annular groove 193 from which a passage shown in dotted lines at 194 opens from the groove 193 to the channel 195. A passage 250 opens from channel 195 to a passage 251 which opens into a chamber 252 about seal 111 thus bleeding any leakage to a low pressure area.

The pump shown in FIGURE 3 is a two stage turbine pump having a shaft 170, a first stage turbine impeller 171 and a second stage turbine impeller 172.

The impeller 171 rotates between liners 173 which cooperate with opposite sides of the impeller 171 to form sealing surfaces 174. The impeller 172 rotates between liners 175 which cooperate with opposite sides of the impeller 172 to form sealing surfaces 176. The case 177 is positioned between frames 178 with case gaskets at 179. The impeller 171 has vanes or blades 180 opening from the opposite sides and peripherally from the impeller which rotate in the channel 181. The impeller 172 has vanes or blades 182 opening from the opposite sides and peripherally from the impeller which rotate in the channel 183. The pump outlet is indicated at 184.

The hub 185 of impeller 171 is fixed, for example, by a Woodruff key or spline 186 to the shaft 170 so that the impeller 171 will rotate with the shaft. The hub 187 of impeller 172 is fixed, for example, by a Woodruff key or spline 188 to the shaft 170 so that the impeller 172 will rotate with the shaft 170. Between the impellers 171 and 172 is a liner bushing 189 surrounding the shaft 170 and having an external annular flange 190 positioned in annular grooves 191 in adjacent liners 173 and 175.

At its left hand end, as shown in FIGURE 3, the shaft 170 is journaled for rotation in a bearing 200. The outer race of the bearing 200 is positioned endwise between adjusting collars 201 and 202 screwed into the adjacent portion of the bearing bracket 178. A housing cap 203 is fastened to the adjacent bearing bracket 178 by set screws 204. A bearing lock nut 205 is screwed onto the adjacent end of the shaft 170 and a bearing lock washer is provided at 206. A water slinger is provided at 207.

Near its right hand end, as shown in FIGURE 3, the shaft 170 is journaled for rotation in a bearing 210. An adjusting collar 211 is screwed into the adjacent portion of the bearing bracket 178 and a bearing lock nut 212 is screwed upon the shaft 170. A bearing lock washer is provided at 214 and a housing cap 215 surrounds the shaft 170 and is fastened to the adjacent bearing bracket 178 by screws 216. A water slinger is shown at 217.

Each bearing bracket 178 has a tubular portion 220 and annular stationary bushings 221 are positioned within the enlarged bores at the inner ends of the tubular portions 220 and held against outward displacement by abutting engagement with the annular shoulders 222. An annular throttle ring 224 is positioned between each bushing 221 and the adjacent ends of the hubs of the impellers 171 and 172. These rings 224 fit closely about the shaft 170.

The shaft 170 carries generally radial pins 225, one for each ring 224. These pins 225 engage at their outer ends in longitudinal grooves 226 in the inner peripheries of the throttle or sealing rings 224. The rings 224 thus rotate with the shaft 170.

In the operation of the pump shown in FIGURE 3, the liquid is delivered from the first turbine stage constituted by the turbine impeller 171 to the second turbine stage constituted by the turbine impeller 172 and is discharged through the pump outlet 184. The pressure or pressure leakage from the adjacent turbine stages along the sealing surfaces 174 and 176 acts on the inner ends of the rotating rings 224 and forces these rings 224 longitudinally or outwardly against the adjacent ends of the stationary bushings 221.

As before, the close fitting rings 224 which rotate with the shaft 170 together with the stationary seal bushings 221 form close restrictions to flow along the shaft in outward directions and without the use of gasketing material. The clearance between the shaft 170 and the rings 224 may be much less than is practical with a stationary bushing alone. Also, as before, the interfaces between the rotating rings 224 and the carbon stationary bushings 221 allow for radial deflection or displacement of the shaft.

Within the tubular portions 220 and outwardly of the bushings 221, the shaft 170 has snap rings 228 engaged therewith and seals 229 are pressed by springs 230 into sealing cooperation with seal seat gaskets 231. Glands are provided at 232 and further snap rings 234 are snapped into grooves in the interior surfaces of the tubular portions 220 near the outer ends thereof.

In FIGURE 3 bleed back passages 240 extend from positions outwardly of the bushings 221 to low pressure areas. The application of this and the foregoing features to a single stage pump are contemplated.

The embodiments of the invention disclosed in the drawings and the specification are for illustrative purposes only, and it is to be especially understood that said drawings and the specification are not to be construed as a definition of the limits or scope of the invention, reference being had to the appended claims for that purpose.

I claim:

1. A centrifugal turbine pump comprising a casing having a pair of internal pumping chambers, a pump shaft mounted for rotation within said casing, a turbine impeller and rotatable part fixed for rotation with said shaft, said turbine impeller being operable within one pumping channel, a centrifugal impeller fixed on the end of said shaft for rotation with said shaft and operable within the other pumping chamber, said turbine impeller having vanes at its outer periphery operable within one of said pumping chambers, liners disposed within said casing and cooperating with oppoiste sides of said turbine impeller inwardly of said vanes to form sealing surfaces therewith, a stationary annular seal bushing surrounding said shaft and disposed between said centrifugal and turbine impellers, and a ring closely fitting said rotatable part of the pump and fixed for rotation with said shaft including a pin rotatable with said shaft, said ring having a longitudinal groove engaging said pin for axial movement, said close fitting ring being disposed between said turbine impeller and said annular seal bushing and movable longitudinally with respect to said shaft, said close fitting ring at the end toward said turbine impeller being exposed to pressure from the turbine impeller reaching the end of said close fitting ring along the sealing surfaces between the turbine impeller and the liner whereby such pressure forces said close fitting ring longitudinally against said annular seal bushing to seal off pressure from said turbine impeller to the centrifugal stage of the pump.

2. A centrifugal turbine pump according to claim 1, wherein the stationary annular seal bushing has an annular groove in its inner surface from which a passage extends to a channel at the turbine stage of the pump.

3. A centrifugal turbine pump according to claim 1, wherein the stationary annular seal bushing surrounds a hub on the centrifugal impeller, and an impeller spacer within said annular seal bushing and surrounding the shaft, said impeller spacer abutting at one end the inner end of the hub on the centrifugal impeller and abutting said turbine impeller at its opposite end.

4. A centrifugal turbine pump according to claim 1, wherein the centrifugal impeller has a suction inlet for the entry of liquid which passes from the centrifugal impeller to the turbine impeller.

5. A centrifugal turbine pump according to claim 1, wherein the stationary annular seal bushing surrounds a hub on the centrifugal impeller, and an impeller spacer within said annular seal bushing and surrounding the shaft, said impeller spacer abutting at one end the inner end of the hub on the centrifugal impeller and abutting said turbine impeller at its opposite end, said impeller spacer being recessed at the end adjacent the turbine impeller to form an annular wall which surrounds a nut which cooperates with the turbine impeller and holds the turbine impeller between said nut and a sleeve surrounding the shaft.

6. A centrifugal turbine pump according to claim 1, wherein the stationary annular seal bushing surrounds a hub on the centrifugal impeller, and an impeller spacer within said annular seal bushing and surrounding the shaft, said impeller spacer abutting at one end the inner end of the hub on the centrifugal impeller and abutting said turbine impeller at its opposite end, said impeller spacer being recessed at the end adjacent the turbine impeller to form an annular wall which surrounds a nut which cooperates with the turbine impeller and holds the turbine impeller between said nut and a sleeve surrounding the shaft, the pin rotatable with the shaft being carried by said impeller spacer.

7. A two stage turbine pump comprising a casing having pumping channels, a shaft mounted for rotation in said casing, a pair of turbine impellers fixed for rotation with said shaft and operable within said casing, each of said impellers having vanes at their outer peripheries operating within said channels, liners disposed within said casing and cooperating with opposite sides of each of said impellers inwardly of said vanes to form sealing surfaces therewith, a first stationary annular seal bushing surrounding said shaft and spaced from one of said impellers, a second stationary annular seal bushing surrounding said shaft and spaced from the other impeller, a first ring closely fitting said shaft and fixed for rotation with said shaft including a pin rotatable with said shaft, a second ring closely fitting said shaft and fixed for rotation with said shaft including a pin rotatable with said shaft, said rings having longitudinal grooves engaging said pins for axial movement, one of said close fitting rings being disposed between one impeller and the annular seal and the first annular seal bushing, the other ring being disposed between the other impeller and the second annular seal bushing, said rings being movable longitudinally with respect to said shaft, and each of said close fitting rings at the ends toward the impellers being exposed to pressure from the impellers reaching the ends of said rings along the sealing surfaces between the impellers and the liners whereby such pressure forces the close fitting rings longitudinally against the annular seal bushings to seal off pressure from the channels in which the vanes of the impellers operate.

8. A two stage turbine pump according to claim 7, wherein there is a liner bushing surrounding the shaft between the impellers.

9. A two stage turbine pump according to claim 7, wherein the casing is positioned between bearing brackets having tubular portions within which said first and second annular seal bushings are positioned.

10. A multi-stage pump according to claim 7, wherein there are bleed backs from positions outwardly of said annular seal bushings to low pressure areas.

References Cited by the Examiner

UNITED STATES PATENTS

| 2,007,414 | 7/1935 | Weis et al. | 277—27 |
| 2,087,313 | 7/1937 | Bigelow et al. | 277—27 |
| 2,258,416 | 10/1941 | Leopold et al. | 103—96 |
| 2,296,640 | 9/1942 | Hensen | 103—96 |
| 2,809,854 | 10/1957 | McGahan | 277—173 |
| 2,875,698 | 3/1959 | Roth | 103—105 |
| 3,001,806 | 9/1961 | Macks | 277—173 |
| 3,002,463 | 10/1961 | Lahti | 103—96 |

SAMUEL LEVINE, *Primary Examiner.*

H. F. RADUAZO, *Assistant Examiner.*